United States Patent
Kutoh et al.

(10) Patent No.: US 8,743,385 B2
(45) Date of Patent: Jun. 3, 2014

(54) SERVICE PROVIDING APPARATUS, SERVICE PROVIDING METHOD, AND COMPUTER READABLE MEDIUM

(75) Inventors: Nobuyuki Kutoh, Kanagawa (JP); Koujirou Oishi, Kanagawa (JP); Hideharu Sakakibara, Kanagawa (JP); Atsushi Mikami, Kanagawa (JP); Tooru Takahashi, Kanagawa (JP)

(73) Assignee: Fuji Xerox Co., Ltd., Tokyo (JP)

(*) Notice: Subject to any disclaimer, the term of this patent is extended or adjusted under 35 U.S.C. 154(b) by 82 days.

(21) Appl. No.: 13/401,141

(22) Filed: Feb. 21, 2012

(65) Prior Publication Data
US 2013/0063759 A1    Mar. 14, 2013

(30) Foreign Application Priority Data
Sep. 13, 2011   (JP) .................................. 2011-199483

(51) Int. Cl.
*G06F 15/00*    (2006.01)

(52) U.S. Cl.
USPC ........................................................... 358/1.14

(58) Field of Classification Search
USPC ........................................................... 358/1.14
See application file for complete search history.

(56) References Cited

U.S. PATENT DOCUMENTS

2007/0256020 A1 * 11/2007 Haga .............................. 715/741

FOREIGN PATENT DOCUMENTS

| JP | A-07-021127 | 1/1995 |
| JP | A-09-293052 | 11/1997 |
| JP | A-2002-132145 | 5/2002 |
| JP | A-2005-208880 | 8/2005 |

* cited by examiner

*Primary Examiner* — Saeid Ebrahimi Dehkordy
(74) *Attorney, Agent, or Firm* — Oliff PLC

(57) ABSTRACT

A service providing apparatus includes the following elements. A communication unit communicates with an external terminal apparatus. An operation unit is used by a user for performing an operation. A notification unit notifies a user of information. A login controller receives a login request of a user from the operation unit or from an external terminal apparatus via the communication unit, and determines whether to permit the login. Upon receipt of a login request from a second user when a first user has already logged in, the login controller notifies the first user of occurrence of the login request via the communication unit or the notification unit, and permits the login of the second user in accordance with a notification received from the first user via the communication unit or an operation performed by the first user with the operation unit.

19 Claims, 18 Drawing Sheets

SERVICE PROVIDING APPARATUS, SERVICE PROVIDING METHOD, AND COMPUTER READABLE MEDIUM

CROSS-REFERENCE TO RELATED APPLICATIONS

This application is based on and claims priority under 35 USC 119 from Japanese Patent Application No. 2011-199483 filed Sep. 13, 2011.

BACKGROUND (i) Technical Field

The present invention relates to a service providing apparatus, a service providing method, and a computer readable medium.

(ii) Related Art

Service providing apparatuses are known which provide users with various services, such as a print function, a scan function, a copy function, and a facsimile function. Users log into the service providing apparatuses, and are thereby permitted to use the services.

A login request of a user may be made directly from an operation unit, such as an operation panel included in a service providing apparatus, or via communication from a terminal apparatus connected to a local area network (LAN). The service providing apparatus that has received the login request performs authentication of the user in order to confirm that the user has permission. This process of authentication is carried out in the service providing apparatus or other authentication apparatuses.

SUMMARY

According to an aspect of the invention, there is provided a service providing apparatus including a communication unit, an operation unit, a notification unit, and a login controller. The communication unit communicates with an external terminal apparatus. The operation unit is used by a user for performing an operation. The notification unit notifies a user of information. The login controller receives a login request of a user from the operation unit or from an external terminal apparatus via the communication unit, and determines whether or not to permit the login. Upon receipt of a login request from a second user when a first user has already logged in, the login controller notifies the first user of occurrence of the login request via the communication unit or the notification unit, and permits the login of the second user in accordance with a notification received from the first user via the communication unit or an operation performed by the first user with the operation unit.

BRIEF DESCRIPTION OF THE DRAWINGS

Exemplary embodiment(s) of the present invention will be described in detail based on the following figures, wherein.

DETAILED DESCRIPTION

Figure 1:
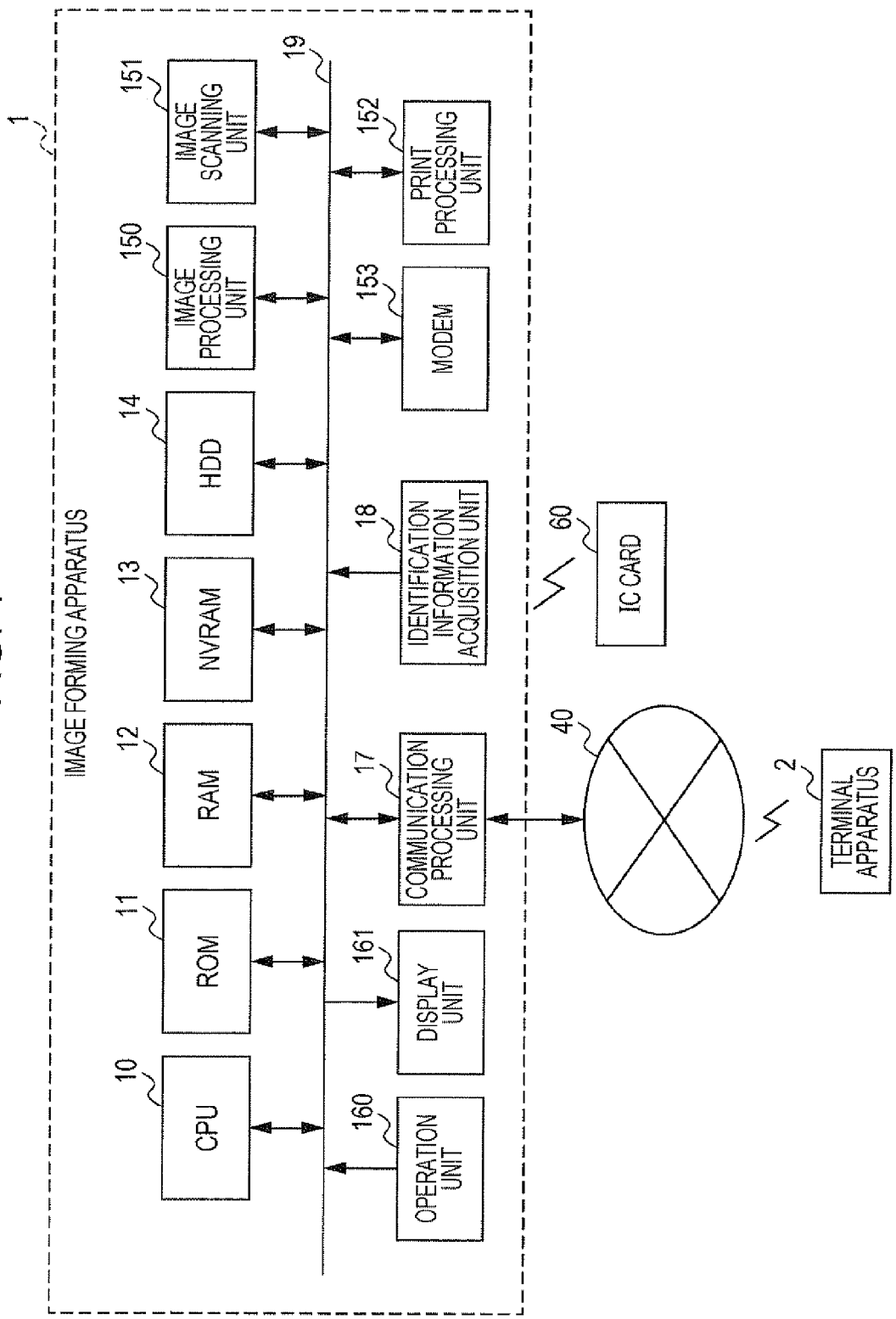
FIG. 1 is a diagram illustrating a configuration of a service providing system.

An image forming apparatus 1 illustrated in FIG. 1 provides users with services, such as a copy function, a print function, a scan function, and a facsimile (fax) function. Although the image forming apparatus 1 is used as a service providing apparatus in this exemplary embodiment, the service providing apparatus is not limited to this particular example. For example, a server that provides users with information may be used. Additionally, the provided services are not limited to the multiple services described above, and only one service may be provided.

The image forming apparatus 1 according to this exemplary embodiment provides services to a currently logged-in user. An operation unit 160 or an identification information acquisition unit 18 of the image forming apparatus 1 or an operation unit 24 of a terminal apparatus 2 serves as a login operation unit used by the user.

The terminal apparatus 2 is a portable terminal apparatus, e.g., a mobile phone or smartphone, and includes a wireless communication unit. The image information apparatus 1 and the terminal apparatus 2 are capable of communicating with each other via a local area network (LAN) 40, for example. The communication technology adopted between the image forming apparatus 1 and the terminal apparatus 2 is not limited to the LAN 40. Other technologies, such as Bluetooth (registered trademark), may be used. Additionally, the terminal apparatus 2 is not limited to an apparatus including a wireless communication unit, such as the aforementioned one, and may be a personal computer including a LAN port for a LAN cable.

First, functions of the image forming apparatus 1 will be described. The image forming apparatus 1 includes a central processing unit (CPU) 10, a read only memory (ROM) 11, a random access memory (RAM) 12, a nonvolatile random access memory (NVRAM) 13, the operation unit 160, a display unit 161, and a communication processing unit 17.

The CPU 10 is an arithmetic processing circuit that controls the image forming apparatus 1, and performs processes, such as a user login process and a service providing process. The ROM 11 stores programs that cause the CPU 10 to operate. The RAM 12 is a working memory that allows the CPU 10 to operate on the basis of the programs. Although the image forming apparatus 1 according to this exemplary embodiment is configured to function on the basis of software as described above, the image forming apparatus 1 may be configured by hardware including an application specific integrated circuit (ASIC).

The NVRAM 13 is, for example, a flash memory. The NVRAM 13 stores an authentication table for use in authentication of users, login management information regarding a currently logged-in user, login request information regarding login requests, parameters regarding operation settings of the image forming apparatus 1, and so forth.

The operation unit 160 is an operation unit that is used by a user for performing an operation, and includes a touch panel and hardware keys. Specifically, the operation unit 160 is used as an instruction unit for instructing execution of the scan function or the like, and as a login operation unit for inputting identification information and a password for login. Once a user performs a login operation using the operation unit 160, the operation unit 160 outputs a login request including the identification information and the password to the CPU 10.

The display unit 161, e.g., a liquid crystal panel, is used along with the touch panel stacked thereon. The display unit 161 is used as a notification unit that notifies a user of information and as a display unit that displays an input screen implemented with the touch panel or the like. For example, the display unit 161 displays a name of a currently logged-in user and a button for executing a service.

The communication processing unit 17 is a communication unit that communicates with an external apparatus. The communication processing unit 17 is connected to the LAN 40 and is constituted of a circuit that processes communication with other apparatuses. When a user attempts to log in using the terminal apparatus 2, the image forming apparatus 1 receives a login request including identification information and a password of the user, from the terminal apparatus 2 via the communication processing unit 17.

The image forming apparatus 1 also includes the identification information acquisition unit 18, a hard disk drive (HDD) 14, an image processing unit 150, an image scanning unit 151, a print processing unit 152, and a modem 153.

The identification information acquisition unit 18 is constituted of an IC card reader or the like, and functions as the login operation unit used by a user to log in, along with the operation unit 160. When a user attempts to log into the image forming apparatus 1, the identification information acquisition unit 18 reads identification information for identifying the user, e.g., an identification number, from an IC card 60 of the user by using near field communication (NFC). The identification information acquisition unit 18 is connected to a main body of the image forming apparatus 1 via an interface, such as a universal serial bus (USB).

For example, an identification number which is a unique number assigned to each user is desirably used as the identification information. However, the identification information is not limited to the identification number and may be a character string including characters such as alphabets.

When attempting to log into the image forming apparatus 1, the user places the IC card 60 over the identification information acquisition unit 18 to cause the image forming apparatus 1 to recognize their identification number. The acquired identification number is output to the CPU 10 together with the login request. The CPU 10 compares the identification number with information of the authentication table stored in the NVRAM 13, thereby performing authentication of the user. Meanwhile, the user may input the identification number directly from the operation unit 160 or by operating the terminal apparatus 2 connected to the LAN 40.

The identification information acquisition unit 18 may be constituted of another apparatus as long as the other apparatus acquires the identification information. For example, an apparatus may be adopted which reads the identification information from a user's magnetic card or from the terminal apparatus 2.

The image scanning unit 151 functions as a scanning unit that scans an image of a document. The image scanning unit 151 scans an image of a document, and generates image data. For example, the image scanning unit 151 exposes the document with light and receives the reflected light with a charge coupled device (CCD), thereby generating the image data.

The HDD 14 stores the image data generated by the image scanning unit 151 and so forth. Under control of the CPU 10, the image data generated by the image scanning unit 151 is sent to the terminal apparatus 2 from the communication processing unit 17 as an email, by using an email address input from the operation unit 160 as a destination, for example. The transmission method is not limited to this particular example, and transmission based on the file transfer protocol (FTP) may be performed.

The image processing unit 150 performs an image data compression process, an image data decompression process, and so forth. The modem 153 is connected to a telephone line and performs fax communication when the fax function is executed. The print processing unit 152 performs a printing process on image data or the like when the print function is executed.

The above-described CPU 10, ROM 11, RAM 12, NVRAM 13, HDD 14, image processing unit 150, image scanning unit 151, print processing unit 152, modem 153, operation unit 160, display unit 161, communication processing unit 17, and identification information acquisition unit 18 are electrically connected to each other via a bus 19.

Figure 2:
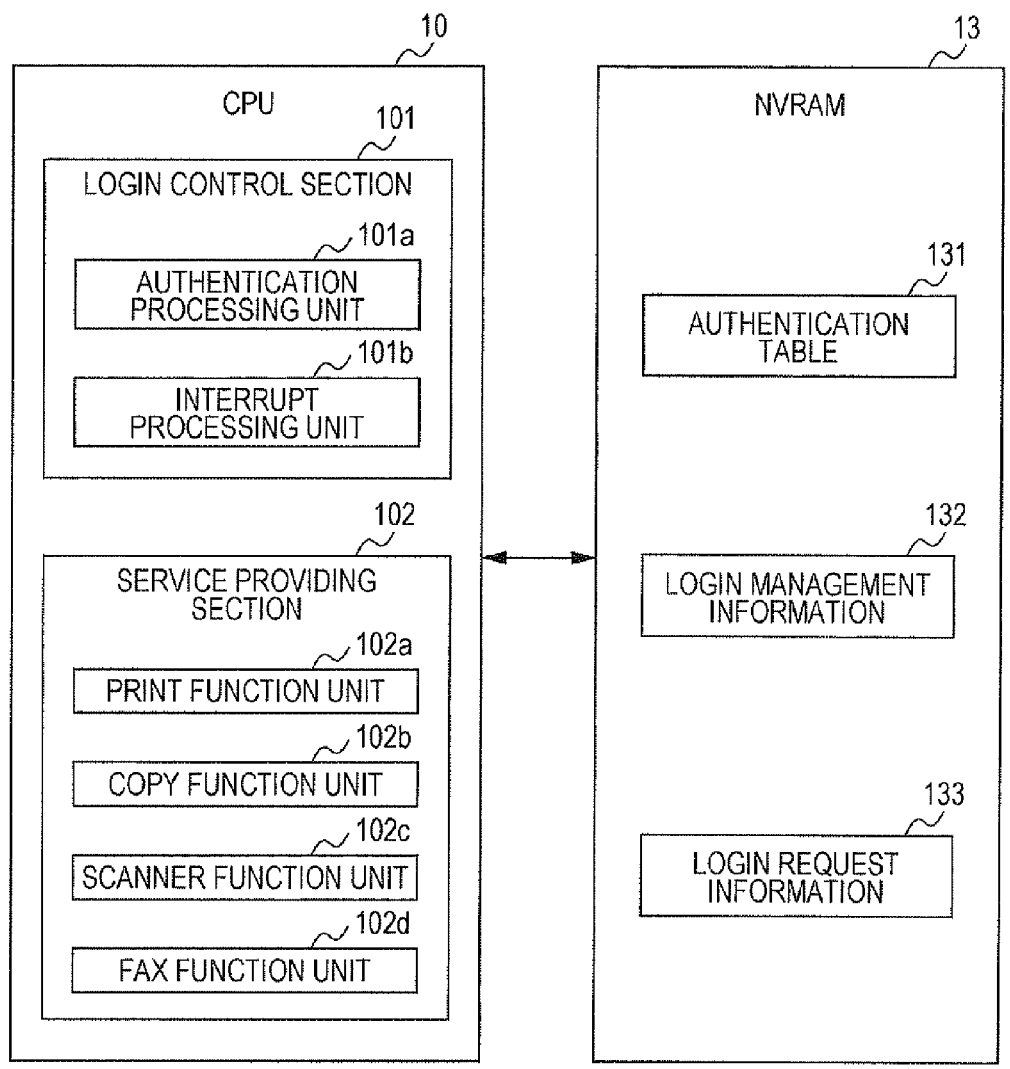
FIG. 2 is a diagram illustrating functional configurations of a central processing unit (CPU) and a nonvolatile random access memory (NVRAM) of an image forming apparatus.

Next, functions of the CPU 10 will be described with reference to FIG. 2. Upon loading a program stored in the ROM 11, the CPU 10 creates a login control section 101 and a service providing section 102 as functions thereof.

The login control section 101 and the service providing section 102 perform processes on the basis of data stored in the NVRAM 13. The NVRAM 13 includes an authentication table 131, login management information 132, and login request information 133. Meanwhile, the authentication table 131, the login management information 132, and the login request information 133 are not necessarily stored in the NVRAM 13 and may be stored in other storage devices, such as the HDD 14.

The login control section 101 functions as a login controller that receives a login request of a user from the operation unit 160 or the identification information acquisition unit 18, or from the external terminal apparatus 2 via the communication processing unit 17, and that determines whether or not to permit the login. The login control section 101 includes an authentication processing unit 101a that authenticates a user, and an interrupt processing unit 101*b* that processes a login request that is received from another user when a user has already logged in. In the description below, a login request that is received from another user when a user has already logged in is referred to as an "interrupt login request".

TABLE 1

| No. | Existing login operation apparatus | Interrupt login operation apparatus |
|---|---|---|
| 1 | Image forming apparatus | Terminal apparatus |
| 2 | Terminal apparatus | Image forming apparatus |
| 3 | Terminal apparatus | Terminal apparatus |

When an interrupt login request occurs, apparatus combinations denoted by Nos. 1 to 3 in Table 1 are possible. In Table 1, the "existing login operation apparatus" indicates an apparatus with which a currently logged-in user has performed a login operation, whereas the "interrupt login operation apparatus" indicates an apparatus with which another user who has made an interrupt login request has performed a login operation.

The example "No. 1" indicates a case where, when there is a user who has already logged in using the operation unit 160 or the identification information acquisition unit 18 of the image forming apparatus 1, another user makes an interrupt login request from the terminal apparatus 2. The example "No. 2" indicates a case where, when there is a user who has already logged in using the terminal apparatus 2, another user makes an interrupt login request using the operation unit 160 or the identification information acquisition unit 18 of the image forming apparatus 1. The example "No. 3" indicates a case where, when there is a user who has already logged in using the terminal apparatus 2, another user makes an interrupt login request from another terminal apparatus 2. By using the above examples Nos. 1 to 3 as assumptions, notification processes for corresponding combinations of the "existing login operation apparatus" and the "interrupt login operation apparatus" will be described below.

Upon receipt of a login request, the login control section 101 stores, in the login request information 133, information about an apparatus with which the login operation has been performed. When the login request is made by operating the operation unit 160 or the identification information acquisition unit 18, identification information indicating the image forming apparatus 1 is stored as the login request information 133. On the other hand, when the login request is made by operating the terminal apparatus 2, an internet protocol (IP) address of the terminal apparatus 2 is stored as the login request information 133.

A login request includes an identification number and a password of each user. The login control section 101 acquires the identification number and the password, and performs an authentication process of the user using the authentication processing unit 101*a*.

TABLE 2

| User name | Identification number | Password |
|---|---|---|
| Robert Smith | 12300010 | PX361B |
| Patricia Johnson | 00001500 | QYH24w |
| John Brown | 00001090 | Uf523S |
| Andrew Williams | 12500830 | 35fbsA |
| Richard Davis | 10100526 | KZ672y |

The authentication processing unit 101*a* authenticates a user on the basis of the authentication table 131 illustrated in Table 2. An identification number and a password that serve as authentication information of each user and a user name of the user are registered in the authentication table 131. The authentication processing unit 101*a* compares the identification number and the password included in the login request with the authentication information of this authentication table 131. When both the identification numbers and the passwords match, the user is authenticated (i.e., authentication succeeds). On the other hand, when the received identification number is not registered or when the passwords disagree, the user is not authenticated (i.e., authentication fails).

Such an authentication process is not necessarily performed in the image forming apparatus 1 and may be performed in another authentication apparatus, such as an authentication server connected to the LAN 40. In this case, the authentication table 131 is held in the other authentication apparatus.

Additionally, authentication using the identification number and the password is described in this exemplary embodiment in terms of security. However, authentication may be performed using the identification number alone depending on the type of the login operation unit. For example, when login is attempted using the operation unit 160 and the terminal apparatus 2, the user is requested to input the password. When login is attempted from the identification information acquisition unit 18 using the IC card 60, input of the password may be omitted. In this case, comparison of the passwords may also be omitted.

When authentication fails, the login control section 101 notifies the user of a failure of authentication. The login control section 101 refers to the login request information 133, and determines a form of the notification in accordance with content of the login request information 133. Specifically, when the login request is made from the image forming apparatus 1 (i.e., the operation unit 160 or the identification information acquisition unit 18), the login control section 101 displays a message indicating the failure of authentication on the display unit 161. When the login request is made from the terminal apparatus 2, the login control section 101 notifies the terminal apparatus 2 of the failure of authentication via the communication processing unit 17. The notification form adopted when the login request is made from the image forming apparatus 1 is not limited to this particular example. For example, the notification may be performed by outputting an audio message from a speaker of the image forming apparatus 1 or the like.

When authentication succeeds, the login control section 101 determines whether or not the login request is an interrupt login request. At this time, the login control section 101 performs the determination with reference to the login management information 132.

TABLE 3

| Identification number | User name | Login operation apparatus | Interrupt |
|---|---|---|---|
| 12300010 | Robert Smith | Image forming apparatus | No |

As illustrated in Table 3, the login management information 132 includes the "identification number" and the "user name" of the currently logged-in user, the "login operation apparatus", and presence or absence of "interrupt". The "identification number" and the "user name" indicate an identification number and a user name that are confirmed to match the corresponding information of the authentication table 131 in the authentication process. The "login operation apparatus" indicates an apparatus with which the currently logged-in user has performed the login operation. When the user has logged into the image forming apparatus 1 by operating the operation unit 160 or the identification information acquisition unit 18 of the image forming apparatus 1, the "login operation apparatus" indicates the identification information of the image forming apparatus 1. On the other hand, when the user has logged into the image forming apparatus 1 by operating the terminal apparatus 2, the "login operation apparatus" indicates the IP address of the terminal apparatus 2.

Additionally, when login is based on an interrupt login request, the "interrupt" indicates "Yes". Otherwise, the "interrupt" indicates "No". That is, Table 3 illustrates the login management information 132 for a case where a user has logged into the image forming apparatus 1 by operating the operation unit 160 or the identification information acquisition unit 18 when the currently logged-in user is absent.

TABLE 4

| Identification number | User name | Login operation apparatus | Interrupt |
|---|---|---|---|
| 00001500 | Patricia Johnson | 192.168.10.11 | Yes |

Table 4 illustrates the login management information 132 for a case where a user has logged into the image forming apparatus 1 using an interrupt login request by operating the terminal apparatus 2.

TABLE 5

| Identification number | User name | Login operation apparatus | Interrupt |
|---|---|---|---|
| — | — | — | — |

Table 5 illustrates the login management information 132 for a case where the currently logged-in user is absent. When a logout operation is performed with the operation unit 160 or the terminal apparatus 2, the login control section 101 receives a logout request and clears each information item of the login management information 132.

When no user information, such as the identification number, is registered in the login management information 132, the login control section 101 determines that the currently logged-in user is absent with reference to the login management information 132, permits login of the user, and stores the login management information 132.

On the other hand, when user information, such as the identification number, is registered, the login control section 101 determines that an interrupt login request has occurred and performs a process using the interrupt processing unit 101*b*. The interrupt processing unit 101*b* notifies the currently logged-in user of occurrence of the interrupt login request via the communication processing unit 17 or the display unit 161, and permits login of the other user in accordance with a notification received from the currently logged-in user via the communication processing unit 17 or an operation performed with the operation unit 160 by the currently logged-in user.

Specifically, the interrupt processing unit 101*b* refers to the login management information 132. When the "login operation apparatus" indicates the image forming apparatus 1, the interrupt processing unit 101*b* displays a message indicating occurrence of the interrupt login request on the display unit 161. The form of the notification presented to the user is not limited to this particular example. For example, the notification may be performed by outputting an audio message from a speaker of the image forming apparatus 1 or the like.

On the other hand, when the "login operation apparatus" indicates the terminal apparatus 2, the interrupt processing unit 101*b* notifies the terminal apparatus 2 of occurrence of the interrupt login request via the communication processing unit 17. At this time, the interrupt processing unit 101*b* refers to the IP address stored in the "login operation apparatus", as notification address information. The table to be referred to is not limited to this particular example, and the interrupt processing unit 101*b* may acquire the address information by referring to a table in which an IP address that corresponds to each identification number or each user name is pre-registered.

The interrupt processing unit 101*b* may notify the currently logged-in user of the identification number or the user name of the user who has made the interrupt login request, via the communication processing unit 17 or the display unit 161 along with occurrence of the interrupt login request. Here, the identification number of the user is acquired from the login request, whereas the user name is acquired from the authentication table 131 in the authentication process.

The interrupt processing unit 101*b* may further notify the user who has made the interrupt login request of the identification information or the user name of the currently logged-in user, via the communication processing unit 17 or the display unit 161. In this case, the interrupt processing unit 101*b* determines a form of the notification with reference to the login request information 133.

Specifically, when the interrupt login request has been made from the image forming apparatus 1 (i.e., the operation unit 160 or the identification information acquisition unit 18), the interrupt processing unit 101*b* displays the identification information or the user name on the display unit 161. The form of the notification presented to the user is not limited to this particular example. For example, the notification may be performed by outputting an audio message from a speaker of the image forming apparatus 1 or the like.

On the other hand, when the interrupt login request has been made from the terminal apparatus 2, the interrupt processing unit 101*b* sends the identification information or the user name to the terminal apparatus 2 via the communication processing unit 17. Meanwhile, the interrupt processing unit 101*b* may simply notify the user of presence of the currently logged-in user without using the identification information or the user name of the currently logged-in user.

The interrupt processing unit 101*b* also refers to the login management information 132. When the "login operation apparatus" indicates the terminal apparatus 2, the interrupt processing unit 101*b* permits login attempted using the interrupt login request, in accordance with a notification received from the terminal apparatus 2 via the communication processing unit 17. On the other hand, when the "login operation apparatus" indicates the image forming apparatus 1, the login processing unit 101*b* permits login attempted using the interrupt login request in accordance with an operation performed with the operation unit 160. That is, whether or not to permit login is determined in accordance with an operation performed by the currently logged-in user.

The service providing section 102 provides services to the currently logged-in user. The service providing section 102 includes a print function unit 102a that executes the print function, a copy function unit 102b that executes the copy function, a scanner function unit 102c that executes the scan function, and a fax function unit 102d that executes the fax function. The print function unit 102a, the copy function unit 102b, the scanner function unit 102c, and the fax function unit 102d control the HDD 14, the image processing unit 150, the image scanning unit 151, the print processing unit 152, and the modem 153 in accordance with a service selected by the user with the operation unit 160 or the terminal apparatus 2. For example, the fax function unit 102d compresses, with the image processing unit 150, image data acquired with the image scanning unit 151, and stores the compressed image data in the HDD 14.

The service providing section 102 refers to the login management information 132. When the "login operation apparatus" indicates the terminal apparatus 2, the service providing section 102 controls the print function unit 102a, the copy function unit 102b, the scanner function unit 102c, and the fax function unit 102d in accordance with an instruction that is received from the terminal apparatus 2 having the corresponding IP address via the communication processing unit 17. On the other hand, when the "login operation apparatus" indicates the image forming apparatus 1, the service providing section 102 controls the print function unit 102a, the copy function unit 102b, the scanner function unit 102c, and the fax function unit 102d in accordance with an operation performed with the operation unit 160.

Figure 3:
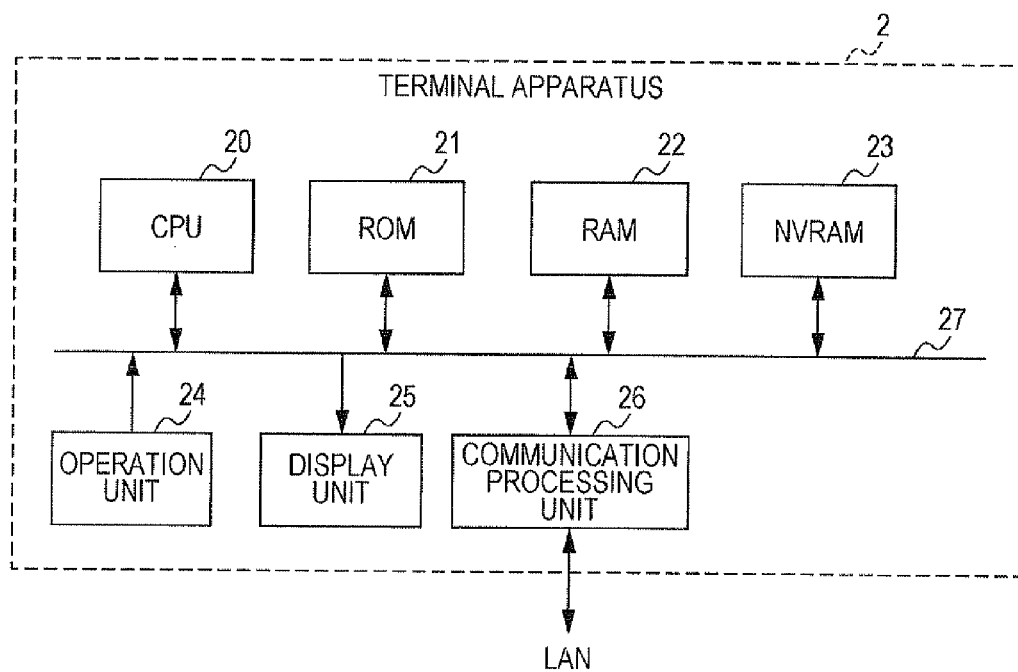
FIG. 3 is a diagram illustrating a functional configuration of a terminal apparatus.

Next, a configuration of the terminal apparatus 2 will be described with reference to FIG. 3. The terminal apparatus 2 includes a CPU 20, a ROM 21, a RAM 22, a nonvolatile memory (NVRAM) 23, the operation unit 24, a display unit 25, and a communication processing unit 26.

The CPU 20 is an arithmetic processing circuit that controls the terminal apparatus 2, and performs processes, such as a login request process and a service selection and instruction process. The ROM 21 stores programs that cause the CPU 20 to operate. The RAM 22 is a working memory that allows the CPU 20 to operate on the basis of the programs. Although the terminal apparatus 2 according to this exemplary embodiment is configured to function on the basis of software as described above, the terminal apparatus 2 may be configured by hardware including an ASIC.

The NVRAM 23 is, for example, a flash memory. The NVRAM 23 stores an identification number for identifying a user (i.e., owner) of the terminal apparatus 2, and parameters regarding operation settings of the terminal apparatus 2.

The operation unit 24 is an operation unit with which a user performs various operations, and includes a touch panel and hardware keys. Specifically, the operation unit 24 is used as an operation device for inputting login information, such as a password, for permitting interrupt login, for selecting a service, and for making a setting regarding the service. The display unit 25, e.g., a liquid crystal panel, is used along with a touch panel stacked thereon. The display unit 25 is used as a display unit that displays login information and an input screen implemented with the touch panel.

The communication processing unit 26 is a communication unit that communicates with an external apparatus. The communication processing unit 26 is connected to the LAN 40 and is constituted of a circuit that processes communication with other apparatuses. The CPU 20, the ROM 21, the RAM 22, the NVRAM 23, the operation unit 24, the display unit 25, and the communication processing unit 26 are electrically connected to each other via a bus 27.

Figure 4:
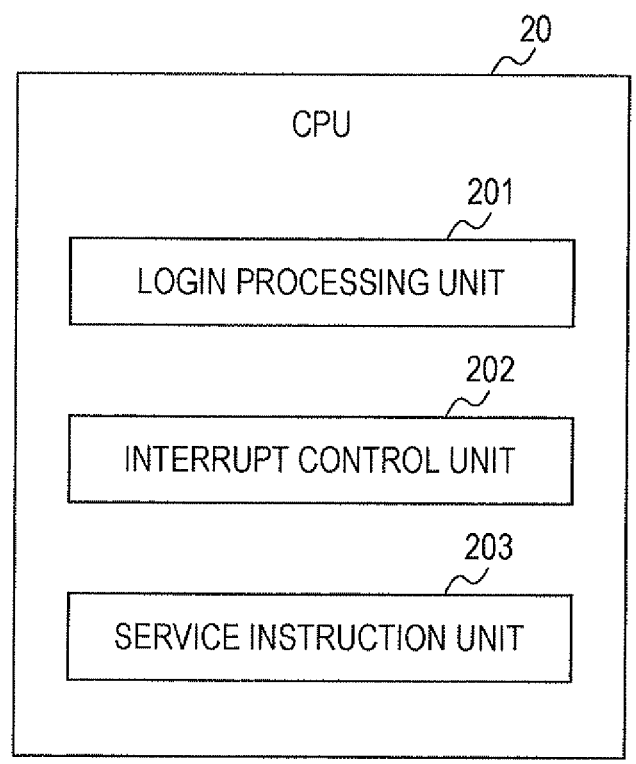
FIG. 4 is a diagram illustrating a functional configuration of a CPU of the terminal apparatus.

Next, functions of the CPU 20 of the terminal apparatus 2 will be described with reference to FIG. 4. Upon loading a program stored in the ROM 21, the CPU 20 creates a login processing unit 201, an interrupt control unit 202, and a service instruction unit 203 as functions thereof.

In accordance with an operation performed with the operation unit 24, the login processing unit 201 sends a login request including an identification number and a password, to the image forming apparatus 1 via the communication processing unit 26. Here, the identification number is acquired from the NVRAM 23, whereas the password is input from the operation unit 24. Alternatively, the identification number may be input from the operation unit 24 like the password.

When the login request is an interrupt login request, the login processing unit 201 receives a notification indicating that another user has already logged in, from the image forming apparatus 1 via the communication processing unit 26, and displays this notification on the display unit 25. When the identification number or the user name of the currently logged-in user is also received along with this notification, the login processing unit 201 also displays this information on the display unit 25. A form of the notification presented to the user is not limited to this particular example. For example, the notification may be performed by outputting an audio message from a speaker of the terminal apparatus 2 or the like.

Upon being notified of permission of login from the image forming apparatus 1, the login processing unit 201 notifies the service instruction unit 203 of success of login. This enables the service instruction unit 203 to instruct, via the communication processing unit 26, the image forming apparatus 1 to execute a service in accordance with an operation performed with the operation unit 24. This instruction includes information on a specified service, such as the scan function, and setting information, such as the document size and the resolution.

Once an interrupt login request occurs when a user has already logged into the image forming apparatus 1 from the terminal apparatus 2, the interrupt control unit 202 receives a notification indicating occurrence of the interrupt login request from the image forming apparatus via the communication processing unit 26, and displays this notification on the display unit 25. When the identification number or the user name of the user who has made the interrupt login request is received along with the notification indicating occurrence of the interrupt login request, the interrupt control unit 202 also displays this information on the display unit 25. A form of the notification presented to the user is not limited to this particular example. For example, the notification is performed by outputting an audio message from the speaker of the terminal apparatus 2 or the like.

The interrupt control unit 202 also sends, to the image forming apparatus 1 via the communication processing unit 26, a notification indicating permission or denial of the interrupt login request in accordance with an operation performed with the operation unit 24.

Figure 5:
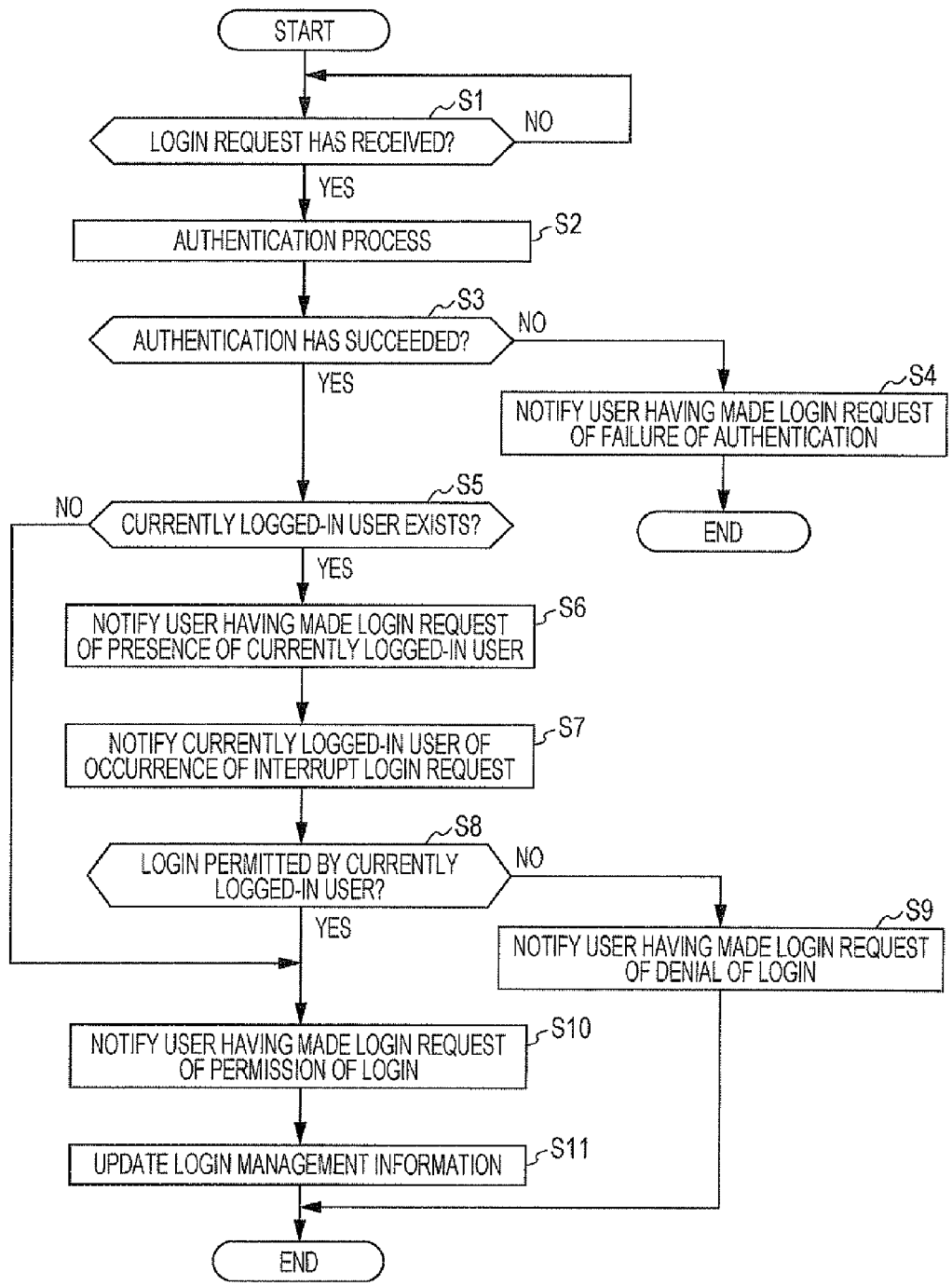
FIG. 5 is a flowchart illustrating a process performed by the CPU of the image forming apparatus.

Next, a process performed by the CPU 10 of the image forming apparatus 1 will be described with reference to FIG. 5. This process is repeatedly performed while the image forming apparatus 1 is active.

Upon receipt of a login request via the operation unit 160, the identification information acquisition unit 18, or the communication processing unit 17 (step S1), the authentication processing unit 101a performs an authentication process on a user who has made the login request (step S2). As described above, the authentication process is performed by comparing the identification number and the password that are included in the login request with the information of the authentication table 131.

Figure 6:
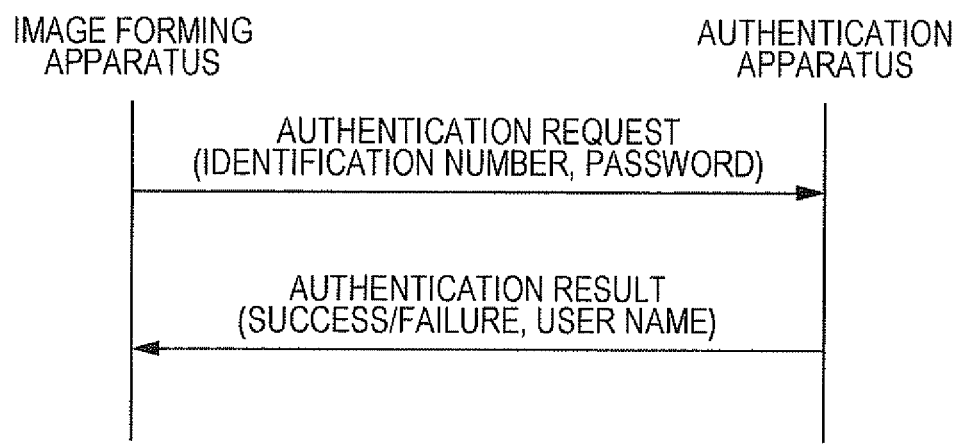
FIG. 6 is a ladder chart illustrating communication performed between the image forming apparatus and an authentication apparatus.

The authentication process may be performed by an authentication apparatus connected to the LAN 40. In this case, the image forming apparatus 1 sends an authentication request including the identification number and the password, to the authentication apparatus via the communication processing unit 17, and acquires an authentication result from the authentication apparatus, as illustrated in FIG. 6. The authentication result includes information indicating whether or not authentication has succeeded. When authentication has succeeded, the authentication result further includes a user name corresponding to the identification number.

When authentication has failed (NO in step S3), the login control section 101 notifies the user who has made the login request of a failure of authentication (step S4), and terminates the process. When the login request has been made by operating the image forming apparatus 1, the login control section 101 displays this notification on the display unit 161. On the other hand, when the login request has been made from the terminal apparatus 2, the login control section 101 notifies the terminal apparatus 2 via the communication processing unit 17.

When authentication has succeeded (YES in step S3), the login control section 101 determines whether or not the currently logged-in user is present with reference to the login management information 132 (step S5). When the identification number or the user name is stored in the login management information 132, the login control section 101 determines that the currently logged-in user is present (YES in step S5). On the other hand, when the identification information or the user name is not stored, the login control section 101 determines that the currently logged-in user is absent (NO in step S5).

When the currently logged-in user is absent (NO in step S5), the login control section 101 notifies the user who has made the login request of permission of login (step S10). When the login request has been made by operating the image forming apparatus 1, the login control section 101 displays this notification on the display unit 161. On the other hand, when the login request has been made from the terminal apparatus 2, the login control section 101 notifies the terminal apparatus 2 via the communication processing unit 17. The login control section 101 then updates the login management information 132 on the basis of information about the user who has made the login request (step S11). Here, "No" is set for the "interrupt" of the login management information 132.

When the currently logged-in user is present (YES in step S5), the interrupt processing unit 101*b* notifies the user who has made the login request of information indicating that another user has already logged in (step S6). When the login request has been made by operating the image forming apparatus 1, the interrupt processing unit 101*b* displays this notification on the display unit 161. On the other hand, when the login request has been made from the terminal apparatus 2, the interrupt processing unit 101*b* notifies the terminal apparatus 2 via the communication processing unit 17. At this time, the interrupt processing unit 101*b* may notify the user of the identification number or the user name of the currently logged-in user along with the information indicating another user has already logged in.

Figure 7:
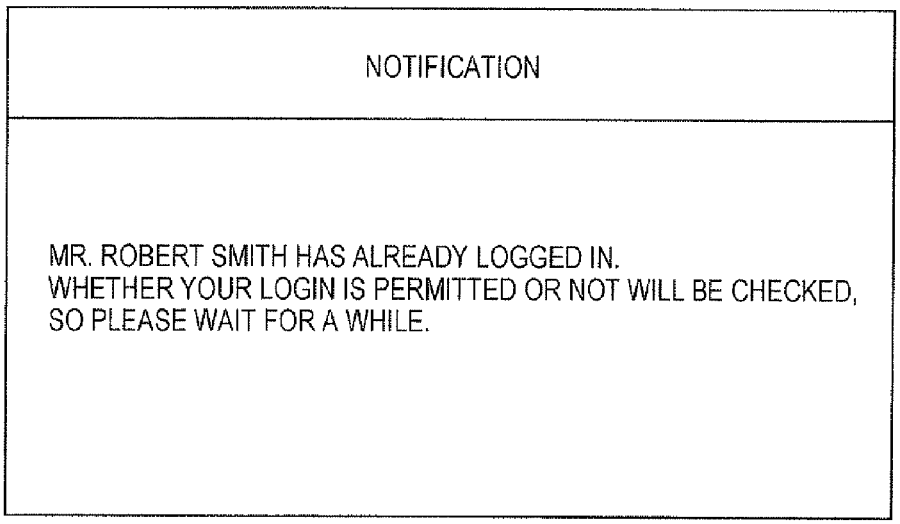
FIG. 7 illustrates an exemplary screen that notifies a user of presence of a currently logged-in user.

For example, as illustrated in FIG. 7, this notification is displayed on the display unit 161 of the image forming apparatus 1 or the display unit 25 of the terminal apparatus 2 along with the user name of the currently logged-in user. Meanwhile, the identification number may be displayed instead of the user name.

The interrupt processing unit 101*b* then notifies the currently logged-in user of occurrence of the interrupt login request (step S7). Before notifying, the interrupt processing unit 101*b* determines a form of the notification with reference to the "login operation apparatus" of the login management information 132.

Specifically, when the "login operation apparatus" indicates the image forming apparatus 1, the interrupt processing unit 101*b* displays this notification on the display unit 161. On the other hand, when the "login operation apparatus" indicates the terminal apparatus 2, the interrupt processing unit 101*b* notifies the terminal apparatus 2 via the communication processing unit 17. At this time, the interrupt processing unit 101*b* may notify the currently logged-in user of the identification number or the user name of the user who has made the interrupt login request along with occurrence of the interrupt login request.

Figure 8:
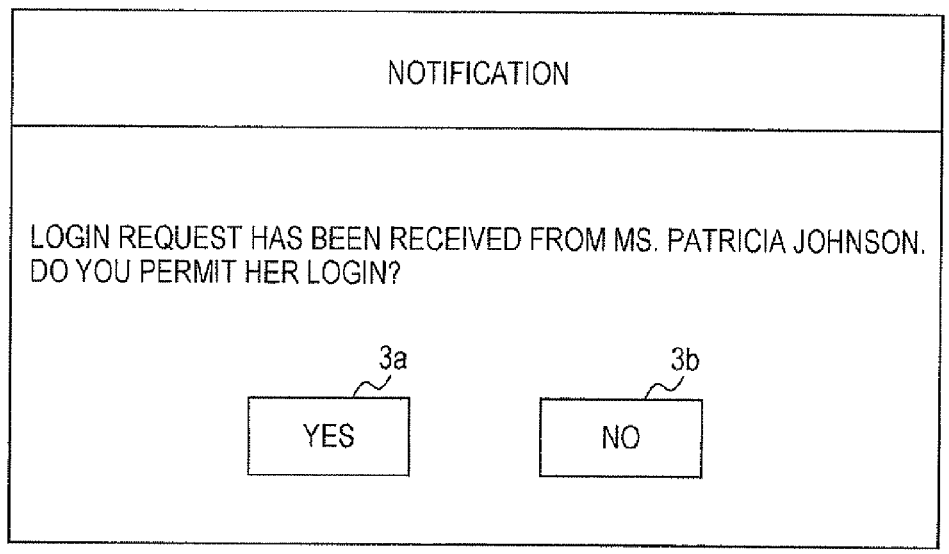
FIG. 8 illustrates an exemplary screen that notifies a user of occurrence of an interrupt login request.

For example, as illustrated in FIG. 8, this notification is displayed on the display unit 161 of the image forming apparatus 1 or the display unit 25 of the terminal apparatus 2 along with the user name of the user who has made the interrupt login request. Meanwhile, the identification number may be displayed instead of the user name.

Upon receipt of a notification for permitting login from the currently logged-in user (YES in step S8), the interrupt processing unit 101*b* determines that the currently logged-in user has permitted the interrupt login request, and notifies the user who has made the interrupt login request of permission of login (step S10).

When the currently logged-in user has logged in from the image forming apparatus 1 (i.e., when the "login operation apparatus" indicates the image forming apparatus 1), permission of login is received from the currently logged-in user through an operation of the operation unit 161. On the other hand, when the currently logged-in user has logged in from the terminal apparatus 2 (i.e., when the "login operation apparatus" indicates the terminal apparatus 2), permission is received from the terminal apparatus 2 via the communication processing unit 17.

For example, when the user selects a "YES" button 3*a* in the screen illustrated in FIG. 8, a login permission notification is generated. On the other hand, when the user selects a "NO" button 3*b*, a login denial notification is generated. In this way, the operation for permitting or denying the login is performed at a timing decided by the user. Accordingly, the user may operate the button 3*a* or 3*b* after a currently executed service is completed, for example.

The login permission notification is presented to the user who has made the interrupt login request in accordance with the login request information 133. Specifically, when the login request has been made by operating the image forming apparatus 1, the login control section 101 displays the notification on the display unit 161. On the other hand, when the login request has been made from the terminal apparatus 2, the login control section 101 sends the notification to the terminal apparatus 2 via the communication processing unit 17.

The interrupt processing unit 101*b* then updates the login management information 132 on the basis of the information about the user who has made the interrupt login request (step S11), and terminates the process. At this time, "Yes" is set for the "interrupt". As a result of this process, the originally logged-in user logs out.

Upon receipt of the login denial notification from the currently logged-in user (NO in step S8), the interrupt processing unit 101b determines that the currently logged-in user has denied the interrupt login request, and notifies the user who has made the interrupt login request of denial of login (step S9). The login control section 101 then refers to the login request information 133. When the login request has been made by operating the image forming apparatus 1, the login control section 101 displays the notification on the display unit 161. On the other hand, when the login request has been made from the terminal apparatus 2, the login control section 101 sends the notification to the terminal apparatus 2 via the communication processing unit 17. The order of steps S6 and S7 is not limited in the aforementioned process, and steps S6 and S7 may be carried out in the opposite order.

Figure 9:
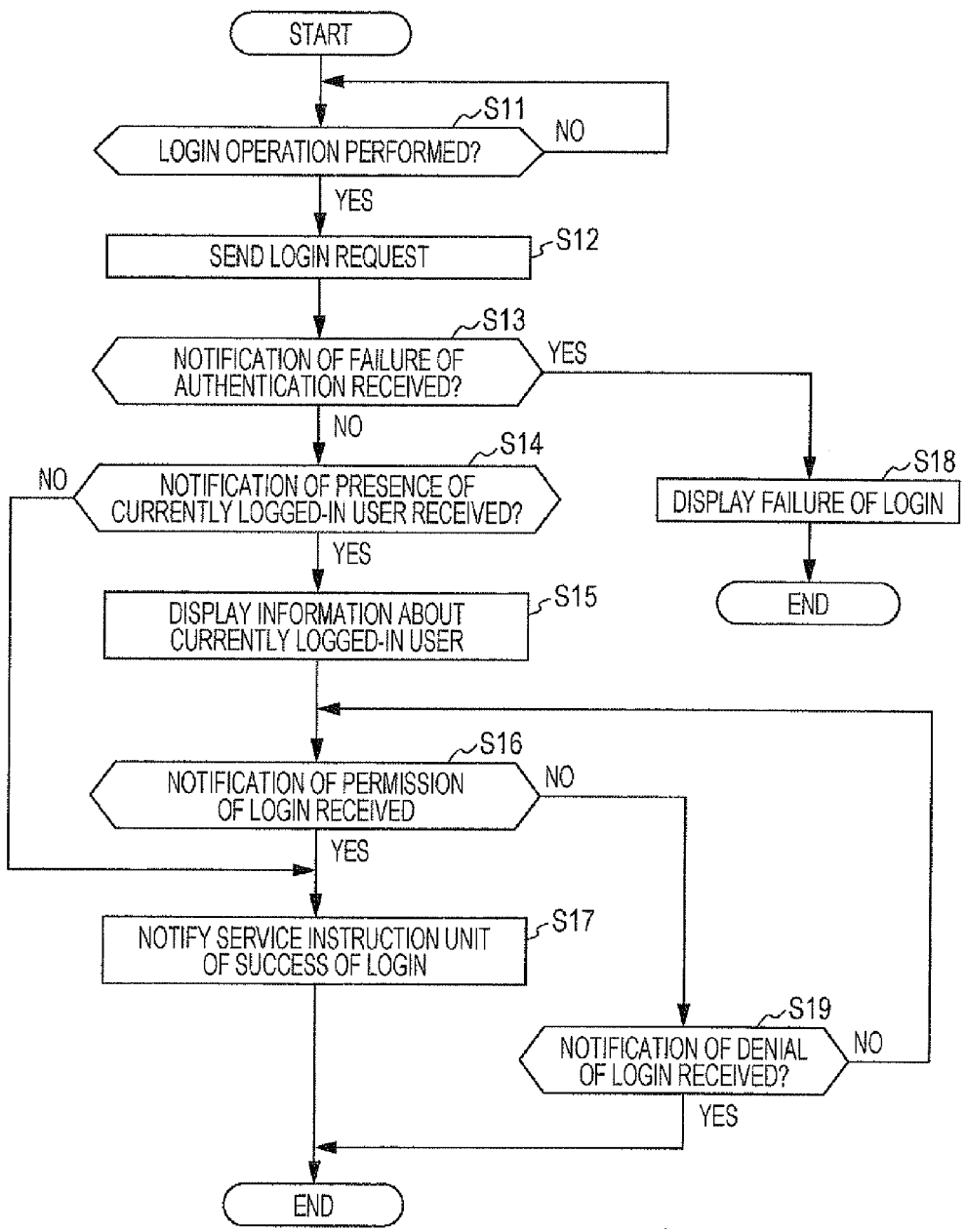
FIG. 9 is a flowchart illustrating a login process performed in the terminal apparatus.

Next, a login process performed by the CPU 20 of the terminal apparatus 2 will be described with reference to FIG. 9. Meanwhile, this process is repeatedly performed while the terminal apparatus 2 is active.

When a login operation is performed with the operation unit 24 (YES in step S11), the login processing unit 201 sends a login request including the input identification number and password, to the image forming apparatus 1 via the communication processing unit 26 (step S12).

Upon receipt of a notification indicating a failure of authentication from the image forming apparatus 1 via the communication processing unit 26 (YES in step S13), the login processing unit 201 displays the notification on the display unit 25 (step S18). When the notification indicating a failure of authentication is not received (NO in step S13), the login processing unit 201 displays information about the currently logged-in user as illustrated in FIG. 7 (step S15) at a time when a notification indicating that another user has already logged in is received from the image forming apparatus 1 via the communication processing unit 26 (YES in step S14).

Upon receipt of the login permission notification from the image forming apparatus 1 via the communication processing unit 26 (YES in step S16), the login processing unit 201 notifies the service instruction unit 203 of success of login (step S17). This is similarly performed when the notification indicating presence of the currently logged-in user is not received (NO in step S14). When the login permission notification is not received (NO in step S16) but the login denial notification is received (YES in step S19), the login processing unit 201 terminates the process. Meanwhile, the login processing unit 201 stands by until the login permission notification or the login denial notification is received (NO in step S16 and S19).

Figure 10:
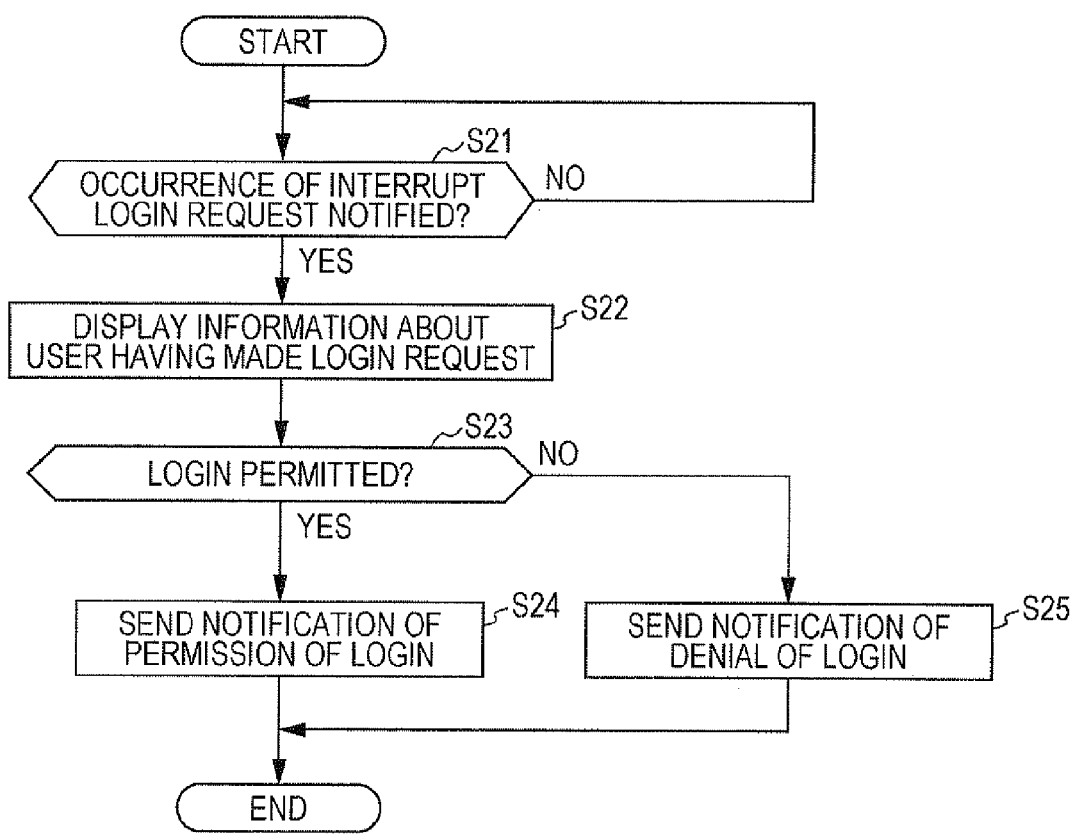
FIG. 10 is a flowchart illustrating an interrupt control process performed in the terminal apparatus.

The description will be given with reference to FIG. 10 for a process performed by the CPU 20 of the terminal apparatus 2 when an interrupt login request occurs. Meanwhile, this process is repeatedly performed while the terminal apparatus 2 is active. Additionally, this process is performed when a user has already logged into the image forming apparatus 1 from the terminal apparatus 2.

Upon receipt of a notification indicating occurrence of an interrupt login request from the image forming apparatus 1 via the communication processing unit 26 (YES in step S21), the interrupt control unit 202 displays information about the user who has made the interrupt login request, on the display unit 25 as illustrated in FIG. 8 (step S22).

When the "YES" button 3a illustrated in FIG. 8 is pushed, the interrupt control unit 202 determines that login is permitted (YES in step S23), and sends a login permission notification to the image forming apparatus 1 via the communication processing unit 26 (step S24). On the other hand, when the "NO" button 3b is pushed, the interrupt control unit 202 determines that login is denied (NO in step S23), and sends a login denial notification to the image forming apparatus 1 via the communication processing unit 26 (step S25).

Figure 11:
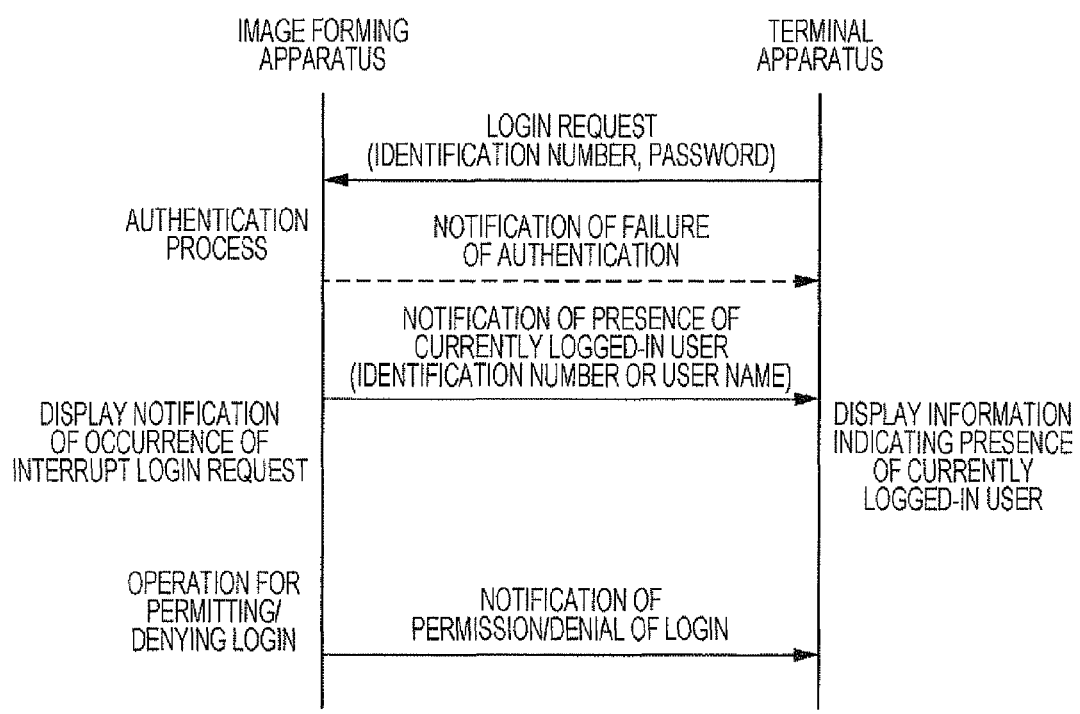
FIG. 11 is a ladder chart illustrating communication performed between the image forming apparatus and the terminal apparatus.
Figure 12:
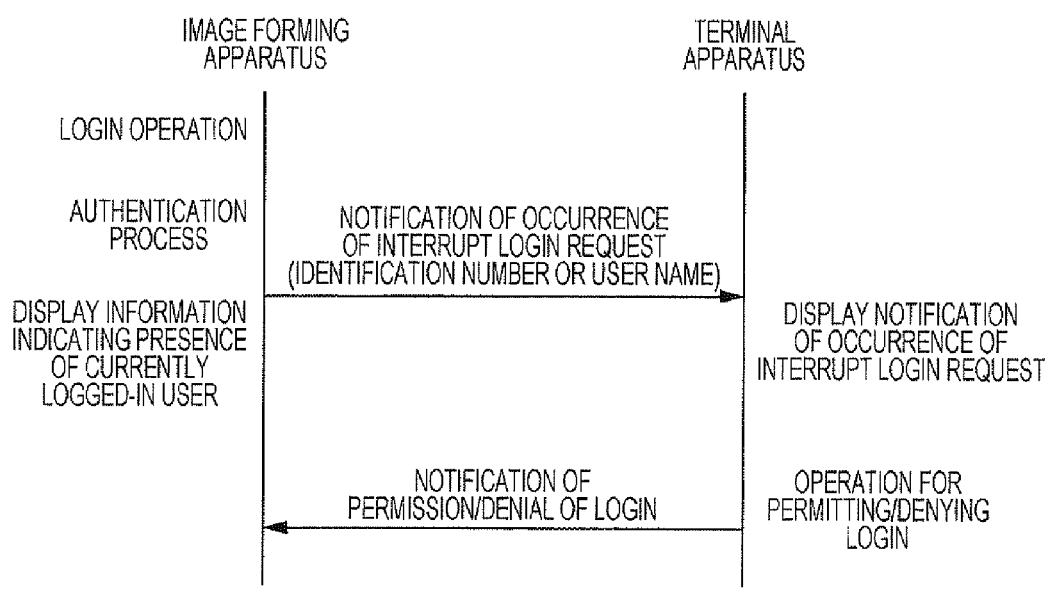
FIG. 12 is a ladder chart illustrating communication performed between the image forming apparatus and the terminal apparatus in another example.
Figure 13:
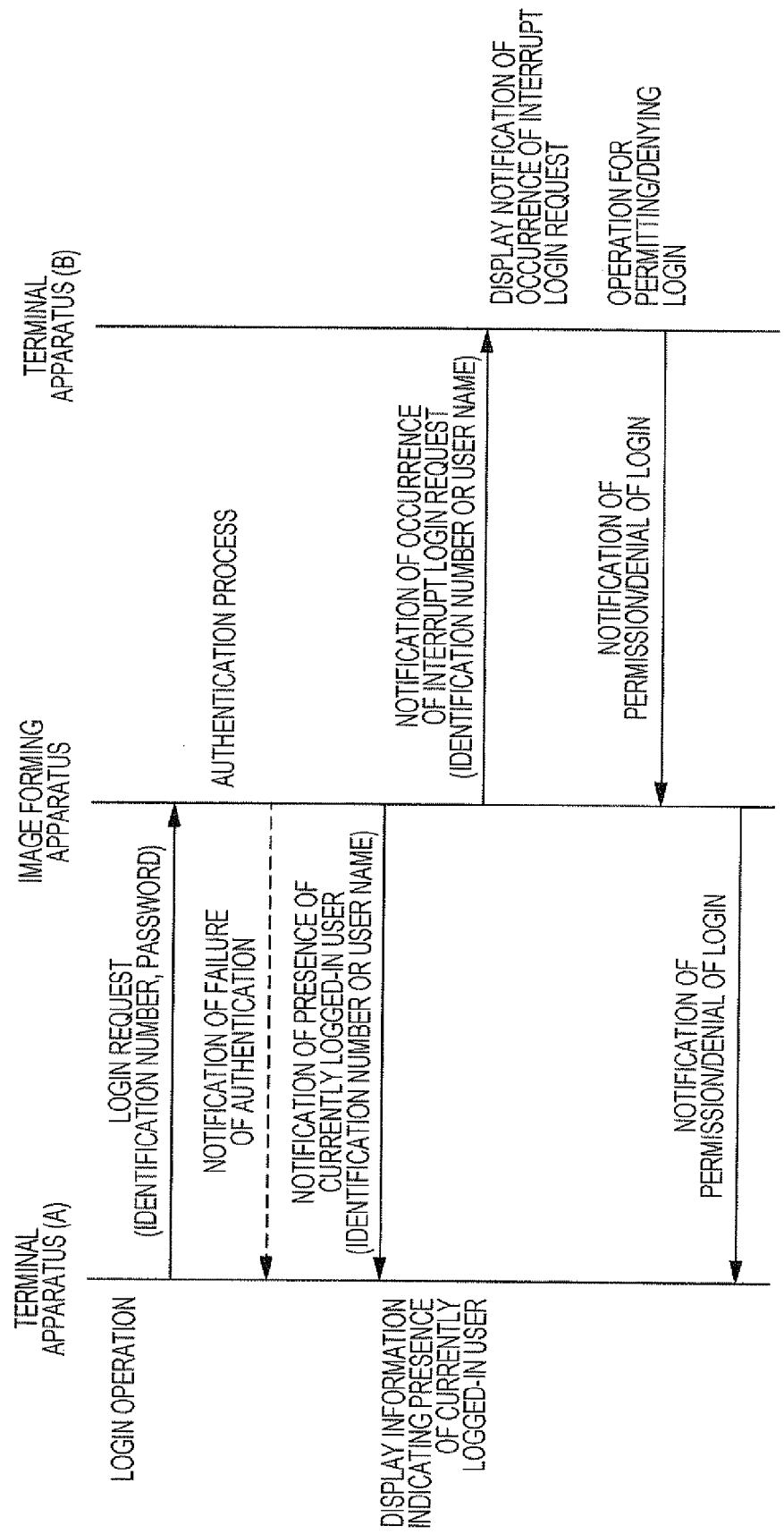
FIG. 13 is a ladder chart illustrating communication performed between the image forming apparatus and the terminal apparatuses in still another example.

Next, communication performed between the image forming apparatus 1 and the terminal apparatus 2 will be described. FIGS. 11 to 13 are ladder charts that correspond to the cases "Nos. 1 to 3" of Table 1 described above.

FIG. 11 illustrates a case where, when there is a user who has already logged in from the operation unit 160 or the identification information acquisition unit 18 of the image forming apparatus 1, another user makes an interrupt login request by operating the terminal apparatus 2. In this case, a login request including the identification number and the password is first sent to the image forming apparatus 1 from the terminal apparatus 2.

When authentication of the user performed by the authentication processing unit 101a fails, a notification indicating a failure of authentication is sent to the terminal apparatus 2 from the image forming apparatus 1. On the other hand, when the authentication of the user succeeds, a notification indicating that another user has already logged in is sent to the terminal apparatus 2 from the image forming apparatus 1 along with the identification number or the user name of the currently logged-in user. Information about the currently logged-in user is then displayed on the display unit 25 of the terminal apparatus 2 as illustrated in FIG. 7.

A notification indicating occurrence of the interrupt login request is then displayed on the display unit 161 of the image forming apparatus 1 as illustrated in FIG. 8. A login permission notification or a login denial notification is sent to the terminal apparatus 2 from the image forming apparatus 1 in accordance with an operation performed by the currently logged-in user. When the login permission notification is sent, the interrupt login attempted by the terminal apparatus 2 succeeds.

FIG. 12 illustrates a case where, when there is a user who has already logged in from the terminal apparatus 2, another user makes an interrupt login request by operating the image forming apparatus 1. In this case, the authentication processing unit 101a first performs authentication of the user who has made the interrupt login request.

When authentication succeeds, the image forming apparatus 1 notifies the terminal apparatus 2 of occurrence of the interrupt login request along with the identification number or the user name. In this way, the notification indicating occurrence of the interrupt login request is displayed on the display unit 25 of the terminal apparatus 2 as illustrated in FIG. 8. Additionally, information about the currently logged-in user is displayed on the display unit 161 of the image forming apparatus 1 as illustrated in FIG. 7.

A login permission notification or a login denial notification is sent to the image forming apparatus 1 from the terminal apparatus 2 in accordance with an operation performed by the currently logged-in user. When the login permission notification is sent, interrupt login attempted by the image forming apparatus 1 succeeds.

FIG. 13 illustrates a case where, when there is a user who has already logged in from the terminal apparatus (B) 2, another user makes an interrupt login request by operating another terminal apparatus (A) 2. In this case, a login request including the identification number and the password is first sent to the image forming apparatus 1 from the terminal apparatus (A) 2.

When authentication of the user performed by the authentication processing unit 101a fails, a notification indicating a failure of authentication is sent to the terminal apparatus (A) 2 from the image forming apparatus 1. On the other hand, when the authentication of the user succeeds, a notification indicating that another user has already logged in is sent to the terminal apparatus (A) 2 from the image forming apparatus 1 along with the identification number or the user name of the currently logged-in user. Information about the currently logged-in user is displayed on the display unit 25 of the terminal apparatus (A) 2 as illustrated in FIG. 7.

Thereafter, the image forming apparatus 1 notifies the terminal apparatus (B) 2 of occurrence of the interrupt login request along with the identification number or the user name. In this way, the notification indicating occurrence of the interrupt login request is displayed on the display unit 25 of the terminal apparatus (B) 2 as illustrated in FIG. 8. A login permission notification or a login denial notification is sent to the image forming apparatus 1 from the terminal apparatus (B) 2 in accordance with an operation of the currently logged-in user.

In accordance with the login permission notification or the login denial notification received from the terminal apparatus (B) 2, the image forming apparatus 1 sends a login permission notification or a login denial notification to the terminal apparatus (A) 2. When the login permission notification is sent, interrupt login attempted by the terminal apparatus (A) 2 succeeds.

As described before, according to this exemplary embodiment, when an interrupt login request occurs, login of another user may be permitted or denied on the basis of an intention of the currently logged-in user. Additionally, since information about a user who has made the interrupt login request is presented as illustrated in FIG. 8, the currently logged-in user may identify the other user who has made the interrupt login request. Further, since information about the currently logged-in user is presented as illustrated in FIG. 7, the other user who has made the login request may identify the currently logged-in user.

Additionally, according to this exemplary embodiment, the other user is not permitted to log in without permission of the currently logged-in user. Thus, a situation may be avoided where a document positioned in the image forming apparatus 1 for scanning by the currently logged-in user is scanned without permission by the other user who has compulsory logged in from the terminal apparatus 2. Further, since the currently logged-in user decides a timing at which login of the other user who has made the interrupt login request is permitted, the utilization efficiency of the image forming apparatus 1 improves.

Next, an example will be described where security is further improved when a user uses the scan function in the above-described exemplary embodiment.

Figure 14:
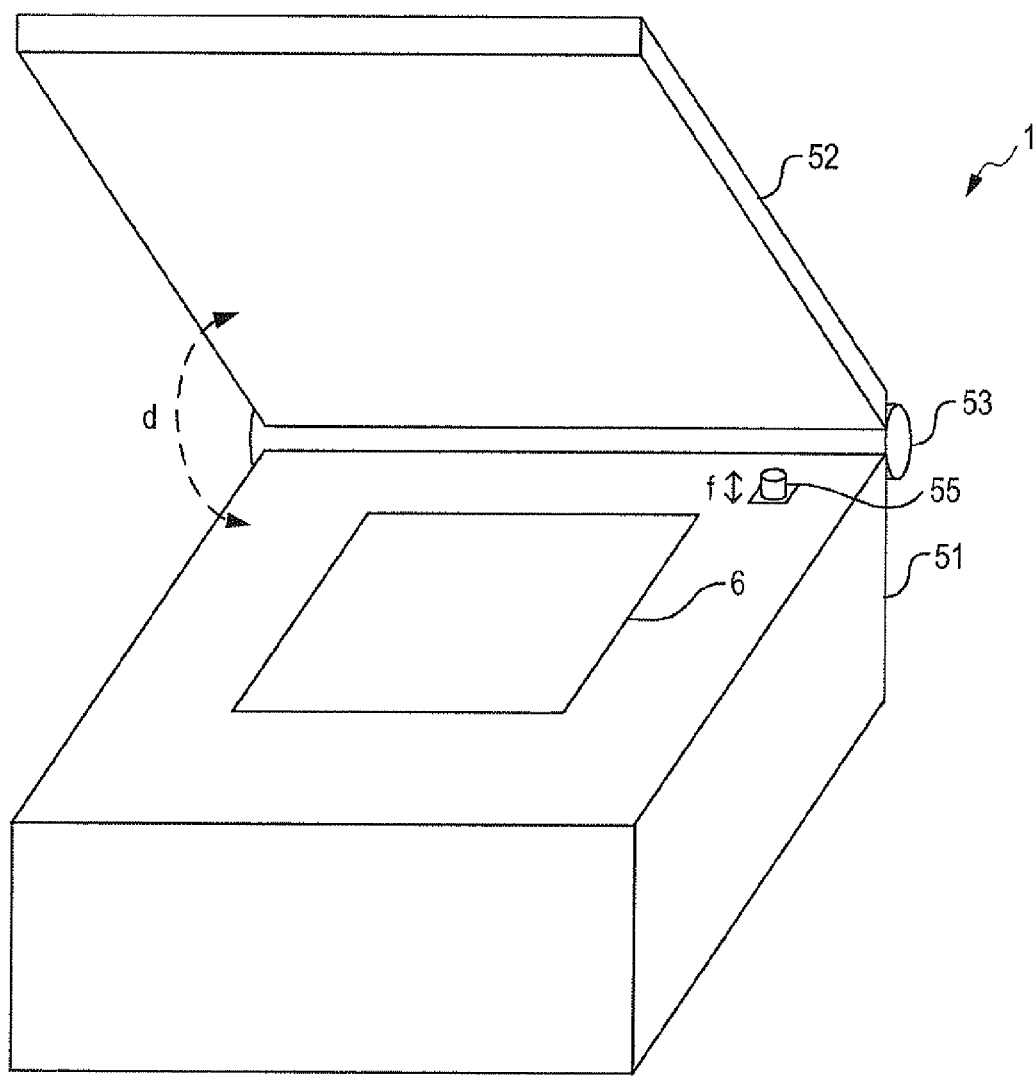
FIG. 14 is a perspective view illustrating a configuration of the image forming apparatus regarding a scan function.

FIG. 14 is a perspective view illustrating a configuration of the image forming apparatus 1 regarding the scan function. The image forming apparatus 1 includes a document table 51 on which a document 6 is to be positioned, an openable and closable platen cover 52, a hinge portion 53 that couples the document table 51 to the platen cover 52, and a switch 55 provided on an upper surface of the document table 51. The document table 51 includes the image scanning unit 151 therein.

A surface of the document table 51 that is to be in contact with the document 6 is constituted of a transparent material, e.g., a platen glass, so that the image scanning unit 151 is able to scan an image printed on the document 6. When the user scans the document 6, the user positions the document 6 on the document table 51 as illustrated in FIG. 14, and closes the platen cover 52.

The surface of each of the document table 51 and the platen cover 52 is formed in a rectangular shape. One side of the document table 51 is coupled to a corresponding side of the platen cover 52 via the hinge portion 53. The platen cover 52 is openable and closeable via the hinge portion 53 in a direction d illustrated in FIG. 14. The platen cover 52 covers the document 6 positioned on the document table 51 when being set in a closed position. In this way, scattered light is prevented from entering from the outside when the image scanning unit 151 scans the document 6.

The switch 55 functions as a detector that detects performance of an operation for positioning a document. Specifically, the switch 55 is provided on the upper surface of the document table 51 and detects an opened or closed state of the platen cover 52.

The switch 55 is provided to penetrate through a hole formed on the upper surface of the document table 51, and is urged outwardly from inside of the document table 51 by an elastic body, such as a spring. Accordingly, when the platen cover 52 is set in the closed position, the switch 55 is in contact with the inner surface of the platen cover 52 and is pressed into the document table 51. In contrast, when the platen cover 52 is set in an opened position, the switch 55 protrudes outwardly from the document table 51 (see a reference f). The detector that detects the opened and closed states of the platen cover 52 is not limited to such a mechanical detector. Detectors of any kinds, such as a magnetic detector and an optical detector, may be used.

Figure 15:
FIG. 15 illustrates an exemplary waveform of a detection signal of a switch that detects opening and closing of a platen cover.

As illustrated in FIG. 15, the switch 55 outputs a detection signal to the CPU 10 in accordance with the opened and closed states of the platen cover 52. For example, a high voltage level of the detection signal represents the opened state, whereas a low voltage level thereof represents the closed state. The relation between the state of the platen cover 52 and the level of the detection signal is not limited to this particular example and may be opposite.

In this exemplary embodiment, when the login control section 101 permits login in response to an interrupt login request, the scanner function unit 102c according to the foregoing exemplary embodiment functions as a scan controller that gives permission to scan an image of the document 6 to the image scanning unit 151 once the switch 55 detects performance of the operation for positioning the document. Specifically, when the login control section 101 permits login of a user who has made an interrupt login request in accordance with a login permission notification received from the operation unit 160 or the terminal apparatus 2 (see steps S8 and S10 in FIG. 5), the scanner function unit 102c permits the image scanning unit 151 to perform scanning on condition that an operation for opening and then closing the platen cover 52 is performed.

Figure 16:
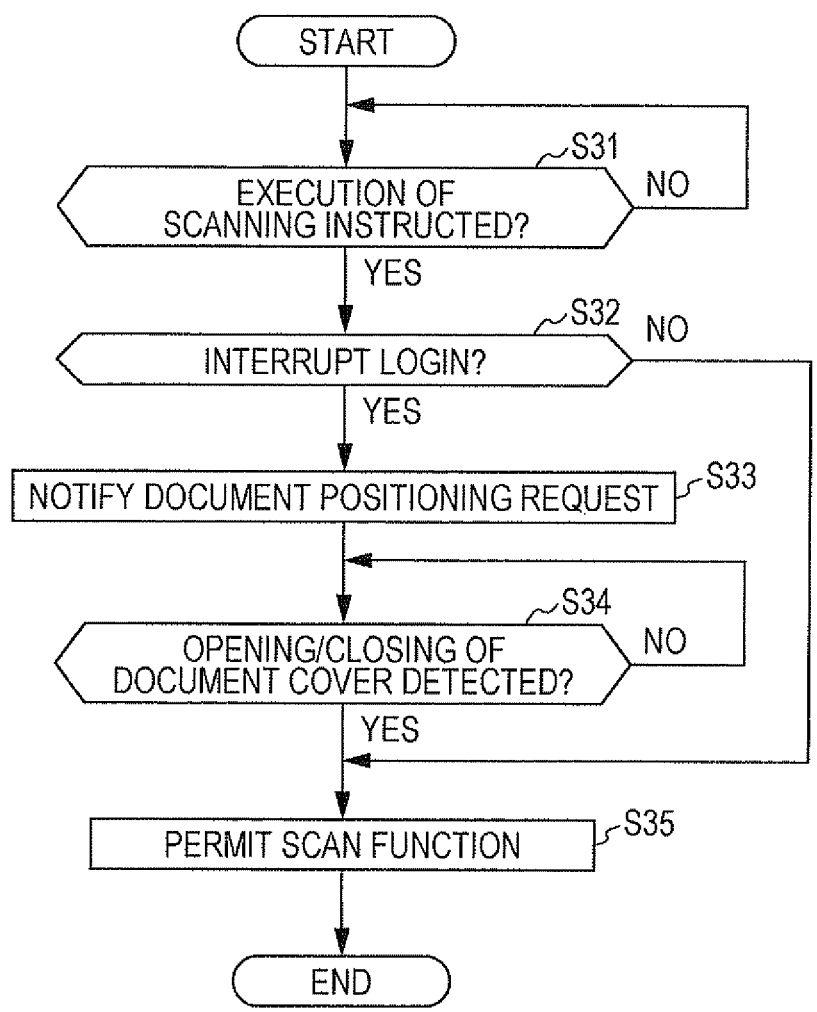
FIG. 16 is a flowchart illustrating a process of executing the scan function.

FIG. 16 illustrates a process performed by the scanner function unit 102c. Once a scan execution instruction is given in accordance with an operation performed with the operation unit 160 of the image forming apparatus 1 or the operation unit 24 of the terminal apparatus 2 (YES in step S31), the scanner function unit 102c determines whether or not the currently logged-in user has logged in using an interrupt login request (step S32). This determination is performed on the basis of the "interrupt" of the login management information 132.

When the "interrupt" indicates "No" (NO in step S32), the scanner function unit 102c gives permission to scan an image of the document 6 to the image scanning unit 151 (step S35). On the other hand, when the "interrupt" indicates "Yes" (YES in step S32), the scanner function unit 102c notifies the terminal apparatus 2 of a document positioning request via the communication processing unit 17 (step S33). In this way, a message that prompts a user to open the platen cover 52 and position a document is displayed on the display unit 25 of the terminal apparatus 2 as illustrated in FIG. 17.

Figure 17:
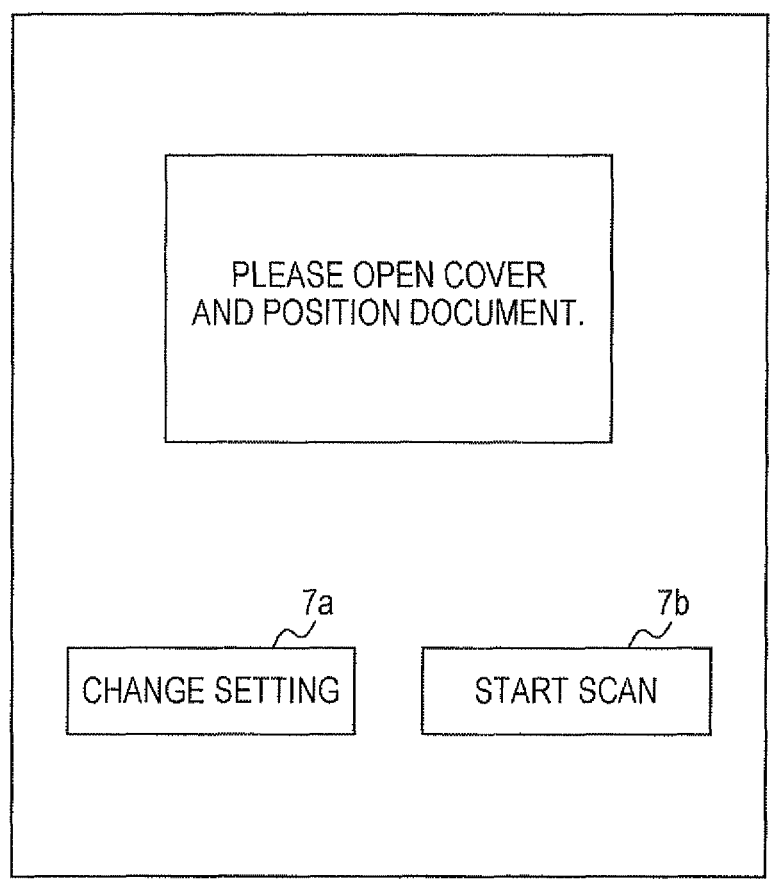
FIG. 17 illustrates an exemplary screen that requests a user to position a document when the scan function is executed.

In the screen illustrated in FIG. 17, a change setting button 7a is an operation button for making a setting, such as the size and resolution of a document to be scanned, whereas a start scan button 7b is an operation button for instructing scanning of the document. Here, the start scan button 7b is not operable until the platen cover 52 is opened and then closed.

Subsequently, the scanner function unit 102c determines whether the platen cover 52 has been opened and then closed, on the basis of the detection signal output from the switch 55 (step S34). Upon detecting that the platen cover 52 has been opened and then closed by the user (YES in step S34), the scanner function unit 102c gives permission to scan an image of the document 6 to the image scanning unit 151 (step S35).

According to this exemplary embodiment, when login is made through an interrupt login request, scanning of an image of the document 6 is not executed unless the document is positioned again. Accordingly, for example, when the currently logged-in user mistakenly permits an interrupt login request with their document being left in the image forming apparatus 1, another user is prevented from scanning the document.

In this exemplary embodiment, performance of an operation for positioning a document is detected on the basis of an operation for opening and then closing the platen cover 52. The method for detecting the document positioning operation is not limited to this particular example.

Figure 18:
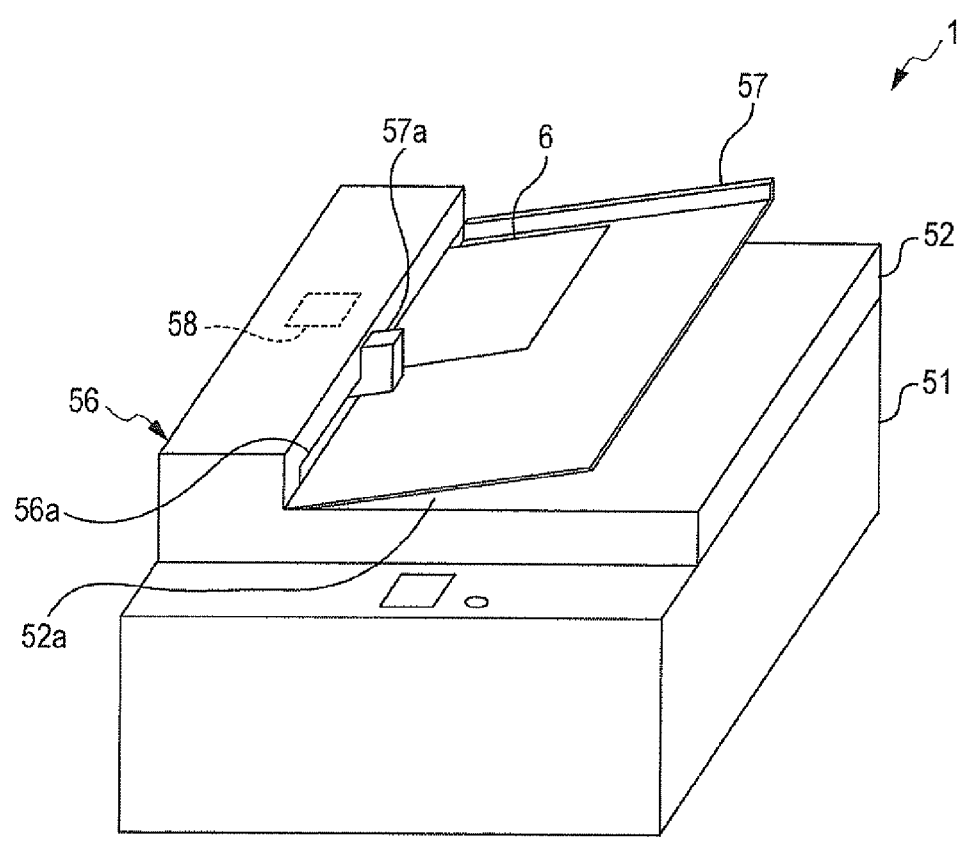
FIG. 18 is a perspective view illustrating another configuration of the image forming apparatus regarding the scan function.

FIG. 18 is a perspective view of the image forming apparatus 1 that adopts another detection method. The image forming apparatus 1 according to this exemplary embodiment includes an automatic document feeder 56, a tray 57, and a sensor 58 in addition to the document table 51 and the platen cover 52 illustrated in FIG. 14. When a user scans a document, the user positions the document 6 on the tray 57 and adjusts a document guide 57a in accordance with the size of the document 6 as illustrated in FIG. 18.

The tray 57 is a plate-like member on which the document 6 is to be positioned, and is provided above the platen cover 52 with being tilted toward the automatic document feeder 56. The tray 57 has the document guide 57a which is slidable in the width direction of the document 6 so that the positioned document 6 is guided to the automatic document feeder 56. The document guide 57a moves along a slit 56a formed on the automatic document feeder 56. An end of the document 6 positioned in the tray 57 is inserted into the slit 56a because of the tilt of the tray 57.

The automatic document feeder 56 is integrally formed with the platen cover 52 at one end portion of the platen cover 52. The automatic document feeder 56 includes a conveying mechanism, such as rollers, loads the document 6 positioned on the tray 57 from the slit 56a, and automatically conveys the document 6. After an image is scanned by the image scanning unit 151, the automatic document feeder 56 discharges the document 6 to a discharge portion 52a which is located below the tray 56.

The sensor 58 functions as a detector that detects performance of an operation for positioning the document 6. Specifically, the sensor 58 is provided inside the automatic document feeder 56, and detects that an end of the document 6 is inserted into the slit 56a. A detection method of the sensor 58 may be any of a mechanical method, a magnetic method, and an optical method.

According to this exemplary embodiment, even when the document 6 is left on the tray 57, a user who has logged in using an interrupt login request is unable to perform scanning unless the user removes the document 6 and positions the document 6 again. Accordingly, as in the foregoing exemplary embodiment, a situation is avoided where the positioned document 6 belonging to another person is scanned without permission by the user who has logged in using the interrupt login request.

Desirable effects similar to those offered by the exemplary embodiments that have been described above may be obtained by supplying an image forming apparatus or a terminal apparatus with a recording medium storing a program for implementing the aforementioned various functions and by executing the program with a computer of the image forming apparatus or the terminal apparatus. Meanwhile, the recording medium may be of any type, such as a compact disc-read only memory (CD-ROM), a digital versatile disc (DVD), or an SD card, as long as the recording medium is computer readable.

While contents of the present invention have been concretely described above with reference to the exemplary embodiments, those skilled in the art may understand that various modifications may occur on the basis of the basic technical spirits and teachings of the present invention.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A service providing apparatus comprising:
 a communication unit that communicates with an external terminal apparatus;
 an operation unit that is used by a user for performing an operation;
 a notification unit that notifies a user of information; and
 a login controller that receives a login request of a user from the operation unit or from an external terminal apparatus via the communication unit, and that determines whether or not to permit the login,
 wherein, upon receipt of a login request from a second user when a first user has already logged in, the login controller notifies the first user of occurrence of the login request via the communication unit or the notification unit, and the second user is permitted, when the login controller permits the login of the second user by a permission received from the first user via the communication unit or by an operation performed by the first user with the operation unit.

2. The service providing apparatus according to claim 1, wherein
 a login request includes identification information for identifying a user, and
 upon receipt of a login request from the second user when the first user has already logged in, the login controller authenticates the second user on the basis of identification information included in the login request, and notifies the first user of the identification information of the second user or a user name that corresponds to the identification information of the second user, via the communication unit or the notification unit.

3. The service providing apparatus according to claim 2, wherein
a login request includes identification information for identifying a user,
upon receipt of a login request from a user, the login controller authenticates the user on the basis of identification information included in the login request, and
upon receipt of a login request from the second user when the first user has already logged in, the login controller notifies the second user of identification information of the first user or a user name that corresponds to the identification information of the first user, via the communication unit or the notification unit.

4. The service providing apparatus according to claim 2, further comprising:
a scanning unit that scans an image of a positioned document;
a detector that detects performance of an operation for positioning a document; and
a scan controller that gives the scanning unit permission to scan an image of a document, once the detector detects performance of the operation for positioning the document after the login controller has permitted the login of the second user in response to the login request received from the second user when the first user has already logged in.

5. The service providing apparatus according to claim 3, further comprising:
a scanning unit that scans an image of a positioned document;
a detector that detects performance of an operation for positioning a document; and
a scan controller that gives the scanning unit permission to scan an image of a document, once the detector detects performance of the operation for positioning the document after the login controller has permitted the login of the second user in response to the login request received from the second user when the first user has already logged in.

6. The service providing apparatus according to claim 1, wherein
a login request includes identification information for identifying a user,
upon receipt of a login request from a user, the login controller authenticates the user on the basis of identification information included in the login request, and
upon receipt of a login request from the second user when the first user has already logged in, the login controller notifies the second user of identification information of the first user or a user name that corresponds to the identification information of the first user, via the communication unit or the notification unit.

7. The service providing apparatus according to claim 6, further comprising:
a scanning unit that scans an image of a positioned document;
a detector that detects performance of an operation for positioning a document; and
a scan controller that gives the scanning unit permission to scan an image of a document, once the detector detects performance of the operation for positioning the document after the login controller has permitted the login of the second user in response to the login request received from the second user when the first user has already logged in.

8. The service providing apparatus according to claim 1, further comprising:
a scanning unit that scans an image of a positioned document;
a detector that detects performance of an operation for positioning a document; and
a scan controller that gives the scanning unit permission to scan an image of a document, once the detector detects performance of the operation for positioning the document after the login controller has permitted the login of the second user in response to the login request received from the second user when the first user has already logged in.

9. The service providing apparatus according to claim 1, wherein the login controller logs the first user out when the login controller permits the login of the second user.

10. The service providing apparatus according to claim 1, further comprising:
a scanning unit that scans an image of a positioned document;
a detector that detects performance of an operation for removing and positioning a document; and
a scan controller that gives the scanning unit permission to scan an image of a document, once the detector detects performance of the operation for removing and positioning the document after the login controller has permitted the login of the second user in response to the login request received from the second user when the first user has already logged in.

11. A service providing method comprising:
communicating with an external terminal apparatus via a communication unit;
accepting an operation performed with an operation unit;
notifying a user of information via a notification unit; and
receiving a login request of a user from the operation unit or from an external terminal apparatus via the communication unit, and determining whether or not to permit the login,
wherein, when a login request arrives from a second user in a state where a first user has already logged in, the first user is notified of occurrence of the login request via the communication unit or the notification unit, and the second user is permitted, when the login controller permits the login of the second user by a permission received from the first user via the communication unit or by an operation performed by the first user with the operation unit.

12. A non-transitory computer readable medium storing a program causing a computer to execute a process for providing a service, the process comprising:
communicating with an external terminal apparatus via a communication unit;
accepting an operation performed with an operation unit;
notifying a user of information via a notification unit; and
receiving a login request of a user from the operation unit or from an external terminal apparatus via the communication unit, and determining whether or not to permit the login,
wherein, when a login request arrives from a second user in a state where a first user has already logged in, the first user is notified of occurrence of the login request via the communication unit or the notification unit, and the second user is permitted, when the login controller permits the login of the second user by a permission received from the first user via the communication unit or by an operation performed by the first user with the operation unit.

13. The non-transitory computer readable medium according to claim 12, wherein a login request includes identification information for identifying a user, and when a login request arrives from the second user in a state where the first user has already logged in, the second user is authenticated on the basis of identification information included in the login request, and the first user is notified of the identification information of the second user or a user name that corresponds to the identification information of the second user, via the communication unit or the notification unit.

14. The non-transitory computer readable medium according to claim 13, wherein a login request includes identification information for identifying a user, when a login request arrives from a user, the user is authenticated on the basis of identification information included in the login request, and when a login request arrives from the second user in a state where the first user has already logged in, the second user is notified of identification information of the first user or a user name that corresponds to the identification information of the first user, via the communication unit or the notification unit.

15. The non-transitory computer readable medium according to claim 13, the process further comprising:

scanning an image of a positioned document;

detecting performance of an operation for positioning a document; and giving permission to scan an image of a document, once performance of the operation for positioning the document is detected after the login of the second user has been permitted in response to the login request received from the second user when the first user has already logged in.

16. The non-transitory computer readable medium according to claim 14, the process further comprising:

scanning an image of a positioned document;

detecting performance of an operation for positioning a document; and giving permission to scan an image of a document, once performance of the operation for positioning the document is detected after the login of the second user has been permitted in response to the login request received from the second user when the first user has already logged in.

17. The non-transitory computer readable medium according to claim 12, wherein a login request includes identification information for identifying a user, when a login request arrives from a user, the user is authenticated on the basis of identification information included in the login request, and when a login request arrives from the second user in a state where the first user has already logged in, the second user is notified of identification information of the first user or a user name that corresponds to the identification information of the first user, via the communication unit or the notification unit.

18. The non-transitory computer readable medium according to claim 17, the process further comprising:

scanning an image of a positioned document;

detecting performance of an operation for positioning a document; and giving permission to scan an image of a document, once performance of the operation for positioning the document is detected after the login of the second user has been permitted in response to the login request received from the second user when the first user has already logged in.

19. The non-transitory computer readable medium according to claim 12, the process further comprising:

scanning an image of a positioned document;

detecting performance of an operation for positioning a document; and giving permission to scan an image of a document, once performance of the operation for positioning the document is detected after the login of the second user has been permitted in response to the login request received from the second user when the first user has already logged in.

* * * * *